United States Patent

[11] 3,575,441

| [72] | Inventors | Klaus H. Arning<br>Birmingham;<br>Robert H. Transou, Jr., Detroit, Mich. |
|---|---|---|
| [21] | Appl. No. | 785,875 |
| [22] | Filed | Dec. 23, 1968 |
| [45] | Patented | Apr. 20, 1971 |
| [73] | Assignee | Ford Motor Company<br>Dearborn, Mich. |

[54] VEHICLE SUSPENSION
15 Claims, 4 Drawing Figs.

[52] U.S. Cl.................................................. 280/124,
267/11, 267/15
[51] Int. Cl..................................................... B60g 11/50
[50] Field of Search.......................................... 267/11, 15;
280/124

[56] References Cited
UNITED STATES PATENTS

| 3,386,752 | 6/1968 | Freers | 280/124 |
| 3,315,981 | 4/1967 | Behles | 280/124 |
| 2,753,007 | 7/1956 | Read | 280/124X |

FOREIGN PATENTS

| 1,147,686 | 6/1957 | France | 267/11 |

*Primary Examiner*—Philip Goodman
*Attorneys*—John R. Faulkner and Clifford L. Sadler ABSTRACT: A rear suspension system for a motor vehicle having a rigid axle housing and a pair of lower suspension arms interconnecting the axle housing with the vehicle chassis. The arms are angled forwardly and outwardly. A stabilizer bar has its center portion extending transversely of the vehicle body and connected to the vehicle frame. The ends of the bar form integral upper suspension arms that extend rearwardly and outwardly and are secured to the axle housing. The stabilizer bar, in combination with the splayed lower arms, controls body roll, lateral body movement and axle windup.

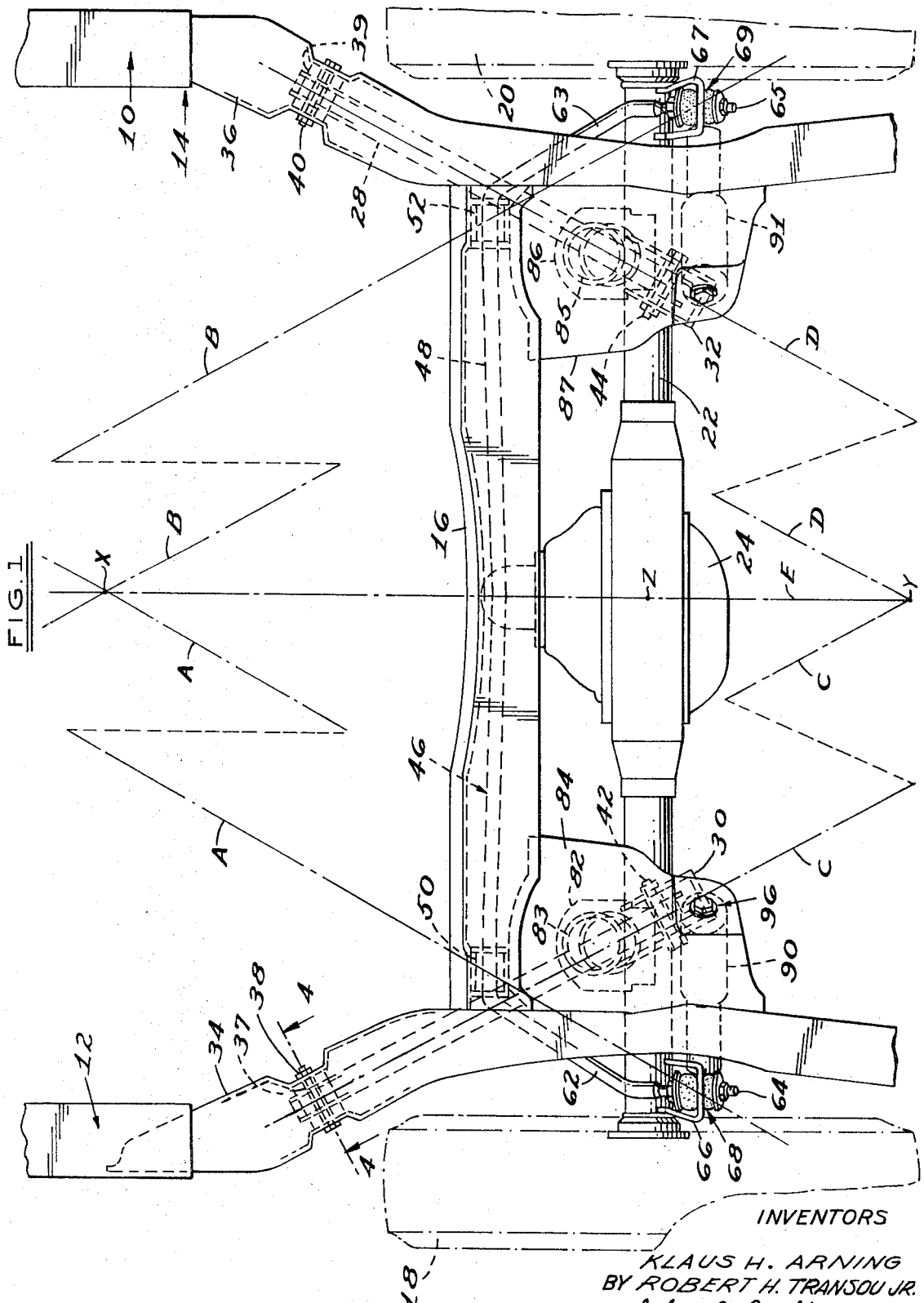

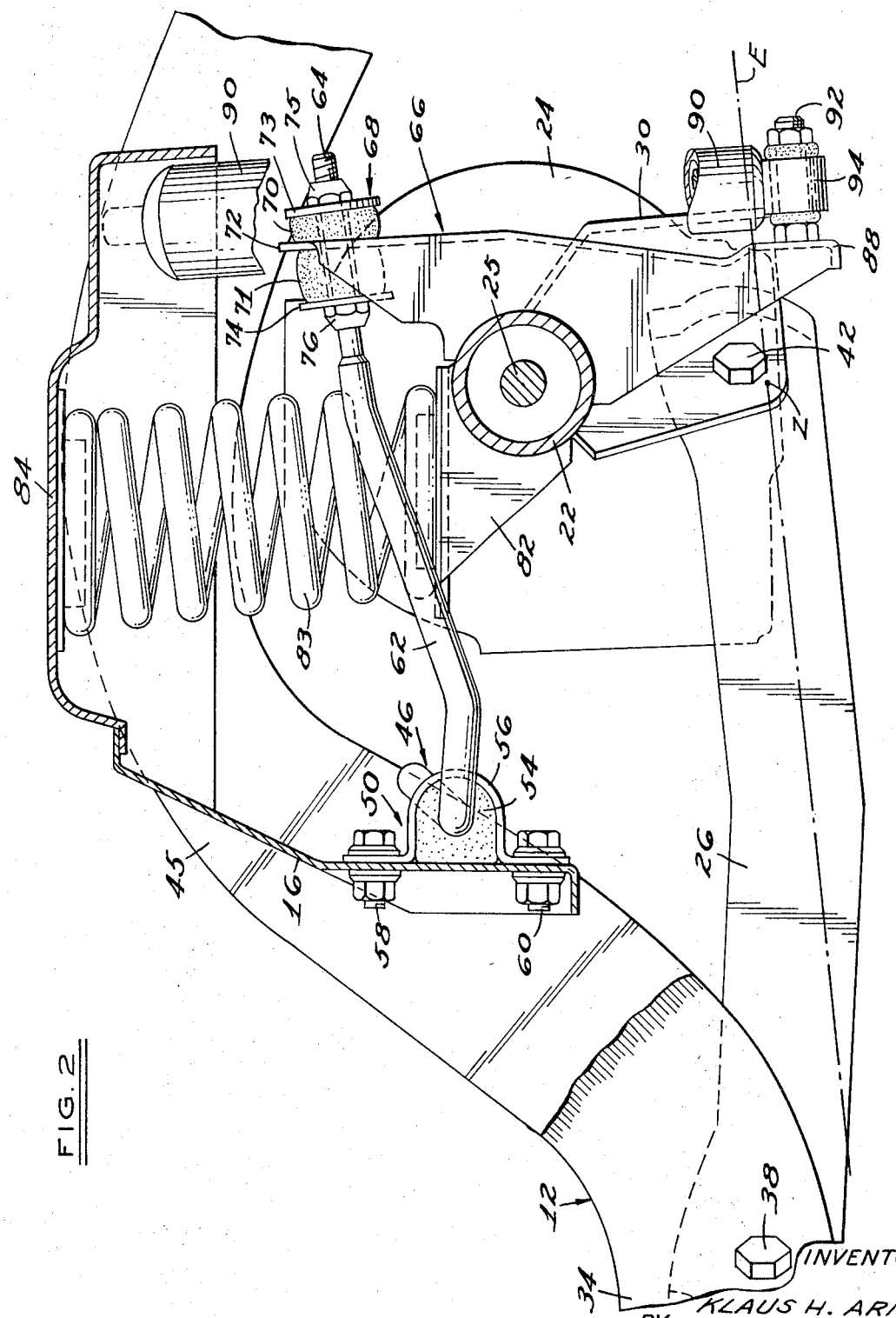

Patented April 20, 1971
3,575,441
3 Sheets-Sheet 3
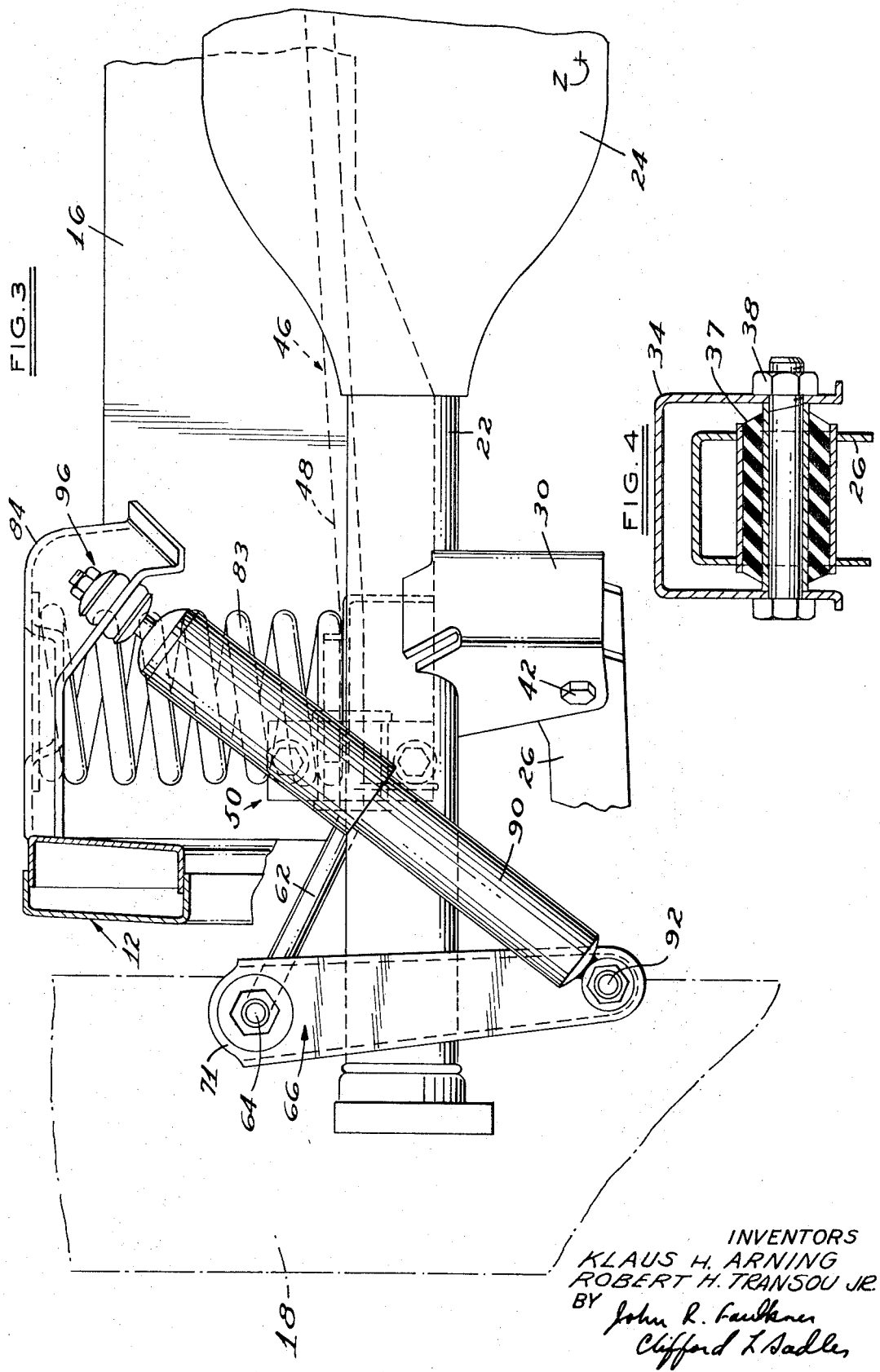
INVENTORS
KLAUS H. ARNING
ROBERT H. TRANSOU JR.
BY John R. Faulkner
Clifford L. Sadler
ATTORNEYS

VEHICLE SUSPENSION

BACKGROUND OF THE INVENTION

It is currently conventional practice in automotive manufacture to provide rear suspension systems of the link and coil-spring type. Usually such a suspension system has a pair of lower arms that extend forwardly and slightly inwardly or are parallel, and one or two upper arms to connect the axle housing with the chassis frame. With this suspension a Panhard rod is provided to control lateral movement. The rod has one end pivotally connected to the frame and extends laterally to a pivotal connection with the axle housing. Spring support of the chassis is provided by coil springs interposed between the frame and the axle housing.

A suspension of this type has several advantages, the principal one being its ability to provide a soft controlled ride. Due to the number of components, however, it is relatively expensive to manufacture and assemble. The large number of parts adds to the complexity of tuning the assembly for ultimate performance.

Therefore, in view of the state of the art, it is an object of the present invention to provide a superior performing rear suspension for a motor vehicle that is particularly characterized by its simplicity and economy of manufacture.

BRIEF SUMMARY OF THE DISCLOSURE

In the presently preferred embodiment of this invention, a rear suspension system is provided having a rigid axle housing interconnecting a pair of driving road wheels. A pair of lower suspension arms have their rear ends connected to axle housing brackets and their forward ends connected to the vehicle frame. The suspension arms are splayed forwardly and outwardly. A one-piece stabilizer bar extends generally transversely of the vehicle and has its midportion journaled on the vehicle frame. The ends of the bar are splayed rearwardly and outwardly and are secured to axle housing brackets. In addition, the splayed ends of the stabilizer bar slope forwardly and downwardly in the side elevational view. Coil springs and shock absorbers are interposed between the axle housing and the vehicle frame.

The one-piece stabilizer bar, in combination with the splayed lower arms, performs the several functions of controlling or preventing lateral body movement, body roll and axle housing windup during acceleration and braking. The slope of the bar ends in side elevational view provides, also in combination with the lower suspension arms, a very desirable low roll center.

The slight resiliency of the several rubber bushings connecting the stabilizer bar and the lower suspension arms to the vehicle frame and to the axle housing permits limited lateral compliance or movement of the body with respect to the rear axle. Because the lower suspension arms are angled forwardly and outwardly, lateral body movement resulting from centrifugal force occurring during a cornering maneuver will cause the axle housing to cant in the direction of understeer. This is known as side thrust understeer which contributes to the superior handling characteristics of a vehicle having a suspension in accordance with the present invention.

DETAILED DESCRIPTION OF THE DRAWINGS

The many objects and advantages of the present invention will become apparent upon consideration of the following detailed discussion and the accompanying drawings in which:

FIG. 1 is a top plan view of a rear suspension system for a motor vehicle constructed in accordance with this invention;

FIG. 2 is a side elevational view, partly in section, of the rear suspension system of FIG. 1;

FIG. 3 is a rear elevational view of the suspension system of FIG. 1; and

FIG. 4 is a sectional view taken along section lines 4-4 of FIG. 3.

DETAILED DESCRIPTION OF THE DISCLOSURE

Referring now to the drawings for a complete understanding of the present invention, a rear suspension system for a motor vehicle constructed in connection with the presently preferred embodiment of this invention is illustrated. In FIG. 1 a chassis frame 10 for supporting a vehicle body comprises left and right side rails 12 and 14. The side rails 12 and 14 are interconnected by a cross frame member 16. The unsprung components of the suspension system of FIG. 1 include left and right road wheels 18 and 20 that are rotatably supported at the outer ends of a rigid axle housing 22. The axle housing 22 includes a differential gear case 24. The differential gearing within the case 24 receives power from the vehicle engine and distributes it through axle shafts (not shown) contained within the housing 22 to the road wheels 18 and 20.

A unique suspension means is provided in accordance with this invention for connecting the axle housing 22 with the vehicle frame 10. The suspension means includes left and right lower suspension arms 26 and 28 having their forward ends connected to the frame side rails 12 and 14 and their rearward ends connected to brackets 30 and 32 welded to the axle housing 22.

It will be noted from FIG. 1 that the suspension arms 26 and 28 are angled or splayed in a forwardly and outwardly direction. The side rails 12 and 14 have angled portions 34 and 36 which generally parallel the angling of the suspension arms 26 and 28. As seen in FIG. 4, side rail portion 34 has a generally open hat-shaped configuration in cross section. The suspension arm 26 is fitted within the rail portion 34 and is pivotally connected thereto by means of a rubber bushing 37 and a pivot bolt 38. The arm 26 has a pair of aligned holes and the rubber bushing 37 is secured in the holes by means of a press fit. The pivot bolt passes through the side flanges of the frame portion 34 and through the center of the rubber bushing 37.

The right lower suspension arm 26 is connected to the frame section 36 by a resilient bushing 39 and a pivot bolt 40. The construction is similar to that illustrated in FIG. 4.

The rear ends of the arms 26, 28 are connected to the axle housing brackets 30 and 32 by means of pivot bolts 42 and 44 that pass through rubber bushings secured to the ends of the arms. The construction of the pivot at the rear ends of the arms 26, 28 is similar to that of FIG. 4.

It will be noted in the side elevational view of FIG. 2 that the frame rail 12 has a kickup portion 45 which passes over the axle housing 22. The kickup portion 45, in combination with the open section of the rail portion 34, permits the arm 26 to transverse a jounce and rebound path about the pivot bolt 38 without contacting the rail 12.

A one-piece integral stabilizing bar 46 has a transversely extending midportion 48 that is journaled at its left and right ends in rubber mounts 50 and 52. As seen in FIG. 2, the rubber mount 50 includes a rubber element 54 that surrounds the bar 46 at the left end of the transverse portion 48. A U-shaped member 56 clamps the rubber in position and is secured to frame member 16 by means of bolts 58 and 60. Although not shown in detail, the construction of the support 52 at the right end of the central bar portion 48 is identical to the construction of the support 50 illustrated in FIG. 2.

The stabilizer bar 46 has integral upper suspension arm portions 62 and 63 that are splayed in a rearwardly and outwardly fashion. The ends 64 and 65 of the bar portions 62 and 63 are connected to brackets 66 and 67 that are welded to the left and right outer ends of the axle housing 22. The bar ends 64, 65 are threaded to permit them to be secured to the axle housing brackets 66, 67 by bayonet-type mounting constructions 68 and 69.

For the left bar end 64 the connecting structure 68 includes a pair of doughnut-shaped rubber elements 70 and 71 that surround the threaded end. The rubber elements 70, 71 are positioned on either side of the central web 72 of the axle housing bracket 66. Washers 73 and 74 are positioned adjacent to the rubber elements 68 and 70 and those elements are loaded in compression by means of nuts 75 and 76 that threadedly engage the end 64 of the bar 46. The bayonet mounting 69 which connects the right-hand bar end 65 to the axle bracket 67 is of similar construction.

In the preferred construction of the present invention, the resilient mounts 50, 52 connecting the bar 46 to the frame 10 and the resilient connections 68 and 69 securing the bar ends 64, 66 to the axle housing brackets 66, 67 have a lower spring rate than the rubber bushings 37, 39 connecting the arms 26, 28 to the frame 10 and the resilient bushings connecting the arms 26, 28 to the axle brackets 30, 32.

A bracket 82 is welded to the axle housing 22 and forms a lower seat for a left coil spring 83. An upper spring seat 84 is welded to the cross member 16 adjacent the frame kickup 45. The upper end of the coil spring 83 is seated on the plate 84. In a similar fashion a right coil spring 85 is interposed between an axle bracket 86 and a frame bracket 87.

Left and right shock absorbers 90 and 91 are provided to dampen relative movement between the frame 10 and the axle 22. The bracket 66 has a depending portion 88 to which the lower end of the hydraulic shock absorber 90 is secured. A cantilever pin 92 passes through an eye 94 situated at the lower end of the shock absorber 90 and functions to secure the eye 94 to the bracket portion 88. The upper end of the shock absorber 90 is secured to the bracket structure 84 forming the upper spring seat by a bayonet-type mounting indicated generally by reference numeral 96. The right shock absorber 92 is interposed between the frame bracket 87 and the axle bracket 67 in a similar manner.

OPERATION

For a mass-produced vehicle a suspension according to this invention has several distinct advantages. Because the stabilizer bar 46 performs a variety of functions the suspension is of uncomplicated construction. As a result, the suspension has a lower piece cost and a correspondingly lower cost of assembly.

In addition to the economies which can be realized with a suspension of the type illustrated in the drawings, it performs in a superior manner. By arranging the ends 62 and 63 in an outwardly and rearwardly configuration as seen in FIG. 1, in combination with the forwardly and outwardly arrangement of the lower suspension arms 26 and 28, lateral stability for the suspension is provided. This arrangement eliminates the need for a Panhard rod to maintain the lateral position of the axle housing.

The angular arrangement of the lower arms 26, 28 relative to the upper arms 62, 63 provides lateral stiffness. This is appreciated from an examination of their longitudinal axes as they appear in plan view (FIG. 1). The effective longitudinal axis of the integral upper suspension arm 62 is indicated in the drawing by axis A which passes through the center of bayonet connection 68 and of mount 52. Axis B passes through the center of connections 69 and 52 and forms the effective longitudinal axis of upper arm 63. The longitudinal axes of arms 26 and 28 are indicated by reference letters C and D, respectively. In one embodiment of the invention, the angle between axes A and C and between axes B and D, when seen in the top plan view (FIG. 1), was 60° for the desired control of lateral stability.

The bar portions 62 and 63, however, in combination with the several rubber bushings and mountings in the suspension system, do permit slight lateral compliance or movement of the vehicle frame 10 (and the body supported thereon) relative to the axle housing 22 during a cornering maneuver.

When the body and frame 10 is displaced laterally, the lower suspension arms 26 and 28, being angled forwardly and outwardly, will tend to cause the axle housing 22 to cant so that the wheels 18 and 20 will assume a slight steering attitude in the direction of understeer. The upper arms 62 and 63, being angled rearwardly and outwardly, will tend to cause the axle to assume a slight oversteer attitude in response to the same lateral body movement. Because the lower arms 26 and 28 are connected to the axle 22 and frame 10 by means of resilient bushings having a higher spring rate than the rubber which connects the bar 46 to the same members, the geometry of the lower arms 26, 28 will dominate and the axle housing 22 will assume an understeer canting in response to a lateral force upon the body. It is recognized that this side thrust understeer feature is a desirable characteristic for a suspension system and that it enhances the stability of a vehicle executing a cornering maneuver.

Lateral displacement and steering angle resulting from centrifugal force are determined, in a suspension according to this invention, by three principal factors: (1) the spring rate of the bushings connecting the various suspension arms to the frame and the axle housing; (2) the spread or separation between the suspension arms; and (3) the geometry or angular arrangement of the arms in the plan view. In the one embodiment of the invention referred to above, the body had a lateral displacement rate of 3,000 to 4,000 pounds per inch. When such a vehicle executed a sharp turn, lateral displacement would be on the order of one-fourth to one-half inch.

As seen in FIG. 2, the axle housing 22 is restrained from rotating about its axis during acceleration and braking by the combination of the upper arm portions 62 and 63 of the bar 46 and the lower arms 26 and 28.

The integral upper arm portions 62 and 63 are angled forwardly and downwardly in the side view (FIG. 2) to provide antisquat forces during acceleration and antilift during braking. This construction also provides a desirable low roll center.

The geometry of the suspension components determines the location of the roll center. In the suspension system illustrated in the drawing, the roll axis E passes through point X which is the intersection of the axes A and B for upper suspension arms 62 and 63 and through point Y which is the intersection of the axes C and D for the lower arms 26 and 28. The roll center is represented by point Z which lies on roll axis E where that axis intersects the center of the axle housing 22 in plan view (FIG. 1). As noted in FIG. 3, the roll center (point Z) is relatively low for a suspension system of the link type. A low roll center, in conjunction with the bar 46, enhances the stability of the vehicle during cornering. The bar 46 functions as a stabilizer and is the principal means for controlling body roll. Springs 83 and 85 are not relied upon as the primary device for roll control. The springs, therefore, may be of a relatively low rate if desired to provide a soft ride. In a conventional link-type suspension, roll stiffness is dependent almost solely upon the location of the coil springs and their rate.

CONCLUSION

A motor vehicle suspension system constructed in accordance with this invention is characterized by its simplicity of construction and economy of manufacture. The upper stabilizer bar performs as an antiroll bar. In combination with the lower arms it functions as a means for controlling lateral body displacement and for preventing axle windup during acceleration. In addition, the construction of the suspension including the arrangement of the components provides lateral compliance with side thrust understeer.

The foregoing description presents the presently preferred embodiment of this invention. Modifications and alterations may occur to those skilled in the art that will come within the scope and spirit of the invention.

We claim:

1. A vehicle suspension system having body support structure, a pair of road wheels, a rigid axle housing rotatably supporting said wheels, suspension means interconnecting said support structure and said axle housing, said suspension means comprising first wheel position means interposed between said axle housing and said support structure, first pivot means connecting said first wheel-positioning means to said axle housing, second pivot means connecting said first wheel-positioning means to said support structure, said first wheel-positioning means being splayed in a forwardly and outwardly manner, second wheel-positioning means interposed between said axle housing and said support structure, said second wheel-positioning means being splayed rearwardly and outwardly, third pivot means connecting said second wheel-positioning means to said axle housing, and fourth pivot means connecting said second wheel-positioning means to said support structure, said first pivot means being spaced inwardly of said third pivot means and said second pivot means being spaced outwardly of said fourth pivot means when said suspension system is observed in top plan view, said first pivot means being vertically spaced apart from said third pivot means when said suspension system is observed in side elevational view.

2. A vehicle suspension system having body support structure, a pair of road wheels, a rigid axle housing rotatably supporting said wheels, suspension means interconnecting said support structure and said axle housing, said suspension means comprising first wheel position means interposed between said axle housing and said support structure, first resilient means connecting said axle housing and to said support structure, said first wheel-positioning means being splayed in a forwardly and outwardly manner, second wheel-positioning means interposed between said axle housing and said support structure, said second wheel-positioning means being splayed rearwardly and outwardly, second resilient means connecting said second wheel-positioning means to said axle housing and to said support structure, said second resilient means having greater resiliency than said first resilient means.

3. A vehicle suspension system according to claim 1 and including said second wheel-positioning means comprising a one-piece stabilizer bar having integral suspension arm portions interposed between said axle housing and said support structure.

4. A vehicle suspension system according to claim 2 and including said second wheel-positioning means comprising a one-piece stabilizer bar having integral suspension arm portions interposed between said axle housing and said support structure.

5. A vehicle suspension system according to claim 2 and including said second wheel-positioning means comprising a one-piece stabilizer bar having integral suspension arm portions interposed between said axle housing and said support structure, said integral suspension arm portions sloping downwardly and forwardly in side elevational view.

6. A vehicle suspension system having a body support structure, a pair of road wheels, a rigid axle housing rotatably supporting said road wheels, suspension means interconnecting said support structure and said axle housing, said suspension means comprising a pair of lower suspension arms, first resilient pivot means connecting said arms to said support structure, second resilient pivot means connecting said arms to said axle housing, said arms being splayed in a forwardly and outwardly manner, a stabilizer bar having a transverse midportion and integral suspension arm portions, third resilient pivot means connecting said stabilizer bar to said support structure, fourth resilient pivot means connecting said stabilizer bar to said axle housing, said integral arm portions being splayed in a rearwardly and outwardly manner, said first resilient means being spaced inwardly of said third resilient means and said second resilient means being spaced outwardly of said fourth resilient means when said suspension system is observed in top plan view, said first resilient means being vertically spaced apart from said third resilient means when said suspension system is observed in side elevational view.

7. A vehicle suspension system having a body support structure, a pair of road wheels, a rigid axle housing rotatably supporting said road wheels, suspension means interconnecting said support structure and said axle housing, said suspension means comprising a pair of lower suspension arms, first resilient pivot means connecting said arms to said support structure and to said axle housing, said arms being splayed in a forwardly and outwardly manner, a stabilizer bar having a transverse midportion and integral suspension arm portions, second resilient pivot means connecting said stabilizer bar to said support structure and to said axle housing, said integral arm portions being splayed in a rearwardly and outwardly manner, said second resilient pivot means having greater lateral resiliency than said first resilient pivot means.

8. A vehicle suspension system having a body support structure, a pair of road wheels, a rigid axle housing rotatably supporting said road wheels, suspension means interconnecting said support structure and said axle housing, said suspension means comprising a pair of lower suspension arms, first resilient pivot means connecting said arms to said support structure and to said axle housing, said arms being splayed in a forwardly and outwardly manner, a stabilizer bar having a transverse midportion and integral suspension arm portions, second resilient pivot means connecting said stabilizer bar to said support structure and to said axle housing, said integral arm portions being splayed in a rearwardly and outwardly manner, said arm portions of said bar sloping downwardly and forwardly in side elevational view.

9. A vehicle suspension system according to claim 7 and including said arm portions of said bar sloping downwardly and forwardly in side elevational view.

10. A vehicle suspension system having a body support structure, a pair of road wheels, a rigid axle housing rotatably supporting said road wheels, suspension means interconnecting said support structure and said axle housing, said suspension means comprising a pair of lower suspension arms, first resilient pivot means connecting said arms to said arms to said support structure and to said axle housing, said arms being splayed in a forwardly and outwardly manner, a stabilizer bar having a transverse midportion and integral suspension arm portions, second resilient pivot means connecting said stabilizer bar to said support structure and to said axle housing, said arms being splayed in a forwardly and outwardly manner, a stabilizer bar having a transverse midportion and integral suspension arm portions, second resilient pivot means connecting said stabilizer bar to said support structure and to said axle housing, said integral arm portions being splayed in a rearwardly and outwardly manner, said support structure comprising left and right frame side rail members, said rail members each having a downwardly open girder portion arranged parallel to one of said lower suspension arms, said girder portions each having spaced vertical sidewall parts, the forward ends of said lower suspension arms being disposed within said girder portions and between said sidewall parts, said first resilient pivot means including means interconnecting said sidewall parts and the ends of said suspension arms.

11. A vehicle suspension system according to claim 7 and including said arm portions of said bar sloping downwardly and forwardly in side elevational view, said support structure comprising left and right frame rail members, said rail members having portions arranged parallel to said lower suspension arms, said rail portions each having spaced vertical sidewall parts, the forward ends of said lower suspension arms being disposed within said rail portions and between said sidewall parts, said first resilient pivot means including means interconnecting said sidewall parts and the ends of said suspension arms.

12. A vehicle suspension means having body support structure, a pair of road wheels, a rigid axle housing rotatably supporting said road wheels, suspension means interconnecting said support structure and said axle housing, said suspension means comprising a pair of suspension arms having their rearward ends pivotally connected to said axle housing, said arms being splayed in a forwardly and outwardly manner, said support structure including left and right frame side rail members, said frame rail members each having a downwardly open girder portion arranged parallel to said suspension arms, said girder portions having spaced sidewall parts, the forward ends of said suspension arms being disposed within said girder portions and between said sidewall parts, pivot means interconnecting said sidewall parts and said suspension arms.

13. A vehicle suspension system according to claim 1 and including said first and third pivot means being laterally resilient, said first pivot means having greater lateral resiliency than said third pivot means.

14. A vehicle suspension system according to claim 6 and including said second pivot means having greater lateral resiliency than said fourth pivot means.

15. A vehicle suspension system according to claim 6 and including said arm portions of said stabilizer bar sloping downwardly and forwardly when observed in side elevational view.

UNITED STATES PATENT OFFICE
CERTIFICATE OF CORRECTION

Patent No. 3,575,441          Dated April 20, 1971

Inventor(s) Klaus H. Arning and Robert H. Transou, Jr.

It is certified that error appears in the above-identified patent and that said Letters Patent are hereby corrected as shown below:

Column 4, line 75, change "position" to -- positioning --.

Column 5, line 23, change "position" to -- positioning --; line 25, after "connecting" insert -- said first wheel positioning means to --; line 59, change "support structure" to -- axle housing --; line 60, change "axle housing" to -- support structure --; line 64, change "support structure" to -- axle housing -- line 65, change "axle housing" to -- support structure --

Column 6, line 37, delete "said" second occurrence; line 38, delete "arms to"; line 43, delete "said arms being splayed in a forwardly and"; delete lines 44, 45, 46; line 47, delete "support structure and to said axle housing".

Column 8, line 1, change "first" to -- third -- line 2, change "third" to -- first --; line 4, change "second" to -- third --; line 5, change "fourth" to -- first --.

Signed and sealed this 7th day of December 1971.

(SEAL)
Attest:

EDWARD M. FLETCHER, JR.          ROBERT GOTTSCHALK
Attesting Officer                Acting Commissioner of Patents